United States Patent
Davis et al.

(10) Patent No.: US 9,607,136 B2
(45) Date of Patent: Mar. 28, 2017

(54) SECURE ATTENTION FOR MOBILE DEVICES

(71) Applicant: LENOVO (Singapore) PTE, LTD., New Tech Park (SG)

(72) Inventors: Mark Charles Davis, Durham, NC (US); Zhang Danfeng, Shenzhen (CN); Li Jun, Beijing (CN)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 142 days.

(21) Appl. No.: 14/139,247

(22) Filed: Dec. 23, 2013

(65) Prior Publication Data

US 2015/0178498 A1  Jun. 25, 2015

(51) Int. Cl.
  *G06F 21/31* (2013.01)
(52) U.S. Cl.
  CPC .................................. *G06F 21/31* (2013.01)
(58) Field of Classification Search
  CPC ...................................................... G06F 21/57
  See application file for complete search history.

(56) References Cited

U.S. PATENT DOCUMENTS

| | | | |
|---|---|---|---|
| 2009/0102653 A1* | 4/2009 | McGinnis | E05B 45/06 340/551 |
| 2014/0075496 A1* | 3/2014 | Prakash et al. | 726/1 |
| 2014/0266684 A1* | 9/2014 | Poder | G08B 25/003 340/521 |

OTHER PUBLICATIONS

Rubini et al., Linux Device Drivers, Jun. 2001, O'Reilly, 2nd Edition, pp. 1-50.*

* cited by examiner

*Primary Examiner* — Dao Ho
(74) *Attorney, Agent, or Firm* — Kunzler Law Group (57) ABSTRACT

For a secure attention indicator at a mobile device, a method is disclosed for detecting a secure attention indicator at a mobile computing device, the secure attention indicator comprising input from one or more of a microphone, a touch sensor, an accelerometer, a photoreceptor, and an orientation sensor, notifying the mobile computing device in response to detecting the secure attention indicator, and executing secure trusted executable code in response to the notification, the secure trusted executable code not modifiable by a user.

20 Claims, 7 Drawing Sheets

SECURE ATTENTION FOR MOBILE DEVICES

FIELD

The subject matter disclosed herein relates to mobile computing devices and more particularly relates to a secure attention indicator for mobile devices.

BACKGROUND

Description of the Related Art

Computing devices typically include software and hardware. Software executing on a computing device may include unauthorized programs. Unauthorized programs may take over portions of the computing device, including the display. An unauthorized program that is in control of the display may trick a user of the computing device to disclose sensitive or confidential information. For example, a malware application may display a login screen that resembles a login screen for a financial institution. This may lure an unwitting user to enter account information, such as a username or a password. The malware application would then be able to access the user's financial accounts.

Also, in some scenarios, software executing on a computing device may not operate properly. This may cause the computing device to stop responding to a user. In order to address both of these problems, in one current solution, an operating system may include a driver that monitors keyboard key presses. The driver may generate a secure attention indicator to notify the operating system of the computing device when a certain combination or sequence of keys have been pressed. In other systems, a special button may be provided on the computing device that generates a secure attention indicator. In one example, Microsoft Windows™ provides a Ctrl-Alt-Del key combination that generates a secure attention indicator. In response to a secure attention indicator, an operating system may execute executable code Managing these situations at a touch screen computing device, such as a tablet computer, may be difficult because the computing device does not typically include many buttons or keys. Therefore, managing a secure attention indicator for a touch screen device requires alternate solutions.

BRIEF SUMMARY

An apparatus for secure attention for a mobile device is disclosed. A method and computer program product also perform the functions of the apparatus. In one embodiment, the apparatus includes a mobile computing device. In another embodiment, the mobile computing device includes a processor. In a further embodiment, the mobile computing device includes a sensor module configured to detect a secure attention indicator. In one embodiment, the secure attention indicator includes input from one or more of a microphone, a touch sensor, an accelerometer, a photoreceptor, and an orientation sensor.

In one embodiment, the mobile computing device includes a notification module configured to notify an execution module in response to the sensor module detecting the secure attention indicator. In another embodiment, the mobile computing device includes an execution module configured to execute secure trusted executable code in response to receiving the notification. In a further embodiment, the secure trusted executable code is not modifiable by a user.

In one embodiment, the mobile computing device includes an input module configured to receive the secure attention indicator. In another embodiment, the input module includes one of physical buttons, a microphone, a touch sensor, an accelerometer, a photoreceptor, a microprocessor, and a memory mapped device. In a further embodiment, the apparatus further includes a user interface module configured to output information to a user of the apparatus. In one embodiment, the information is based on the secure trusted executable code.

In one embodiment, the microprocessor includes one of a general purpose input/output pin and an interrupt handler. In another embodiment, the secure attention indicator includes a combination of two or more physical buttons, microphones, touch sensors, accelerometers, photoreceptors, microprocessors, and memory mapped devices.

In one embodiment, the notification module operates as a low level driver for an operating system. In another embodiment, the low level driver receives the secure attention indicator from the sensor module. In a further embodiment, the secure trusted executable code includes an application.

In one embodiment, the notification module includes a memory mapped device. In another embodiment, the notification module sets an indicator in the memory mapped device, and the execution module receives the notification by reading the indicator in the memory mapped device.

In another embodiment, the sensor module, the notification module, and the execution module comprise one or more of semiconductor hardware, a memory storing computer readable code, and a processor executing the computer readable code.

A method is disclosed for managing a secure attention for a mobile device. In one embodiment, the method includes detecting a secure attention indicator at a mobile computing device. In one embodiment, the secure attention indicator includes input from one or more of a microphone, a touch sensor, an accelerometer, a photoreceptor, and an orientation sensor.

In another embodiment, the method includes notifying the mobile computing device in response to detecting the secure attention indicator. In a further embodiment, the method includes executing secure trusted executable code in response to the notification. In one embodiment, the secure trusted executable code is not modifiable by a user of the mobile computing device.

In one embodiment, the method includes receiving the secure attention indicator via one or more input devices of the mobile computing device, the one or more input devices. In another embodiment the input devices include one of a physical button, a microphone, a touch sensor, an accelerometer, a photoreceptor, a microprocessor, and a memory mapped device. In a further embodiment, the microprocessor includes at least one of a general purpose input/output pin and an interrupt handler.

In one embodiment, the secure attention indicator includes a combination of two or more of the physical buttons, microphones, touch sensors, accelerometers, photoreceptors, microprocessors, and memory mapped devices. In another embodiment, notifying the mobile computing device includes notifying a low level driver for an operating system. In a further embodiment, the operating system operates the mobile computing device. In one embodiment, the low level driver causes the secure trusted executable code to be executed.

In one embodiment, notifying the mobile computing device includes setting an indicator in a memory mapped device. In another embodiment, the executing the secure trusted executable code includes executing the secure trusted executable code in response to reading the indicator in the memory mapped device.

A computer program product is disclosed for a secure attention for a mobile device. In one embodiment, the program product includes a computer readable storage medium storing computer readable code executable by a processor. In another embodiment, the processor performs detecting a secure attention indicator at a mobile computing device. In a further embodiment, the secure attention indicator includes input from one or more of a microphone, a touch sensor, an accelerometer, a photoreceptor, and an orientation sensor. In another embodiment, the processor performs notifying the mobile computing device in response to detecting the secure attention indicator. In a further embodiment, the processor performs executing secure trusted executable code in response to the notification. In one embodiment, the secure trusted executable code is not modifiable by a user of the mobile computing device.

In one embodiment, the computer readable code further includes receiving the secure attention indicator via one or more input devices of the mobile computing device. In another embodiment, the one or more input devices include one of a physical button, a microphone, a touch sensor, an accelerometer, a photoreceptor, a microprocessor, and a memory mapped device.

In one embodiment, the secure attention indicator includes setting a general purpose input/output pin of a microprocessor. In another embodiment, the secure attention indicator includes a combination of two or more of the physical buttons, microphones, touch sensors, accelerometers, photoreceptors, microprocessors, and memory mapped devices. In a further embodiment, notifying the mobile computing device comprises notifying a low level driver for an operating system operating the mobile computing device. In one embodiment, the low level driver causes the secure trusted executable code to be executed.

In one embodiment, notifying the mobile computing device includes setting an indicator in a memory mapped device, and executing the secure trusted executable code includes executing the secure trusted executable code in response to reading the indicator in the memory mapped device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code. Descriptions of Figures may refer to elements described in previous Figures, like numbers referring to like elements.

Figure 1:
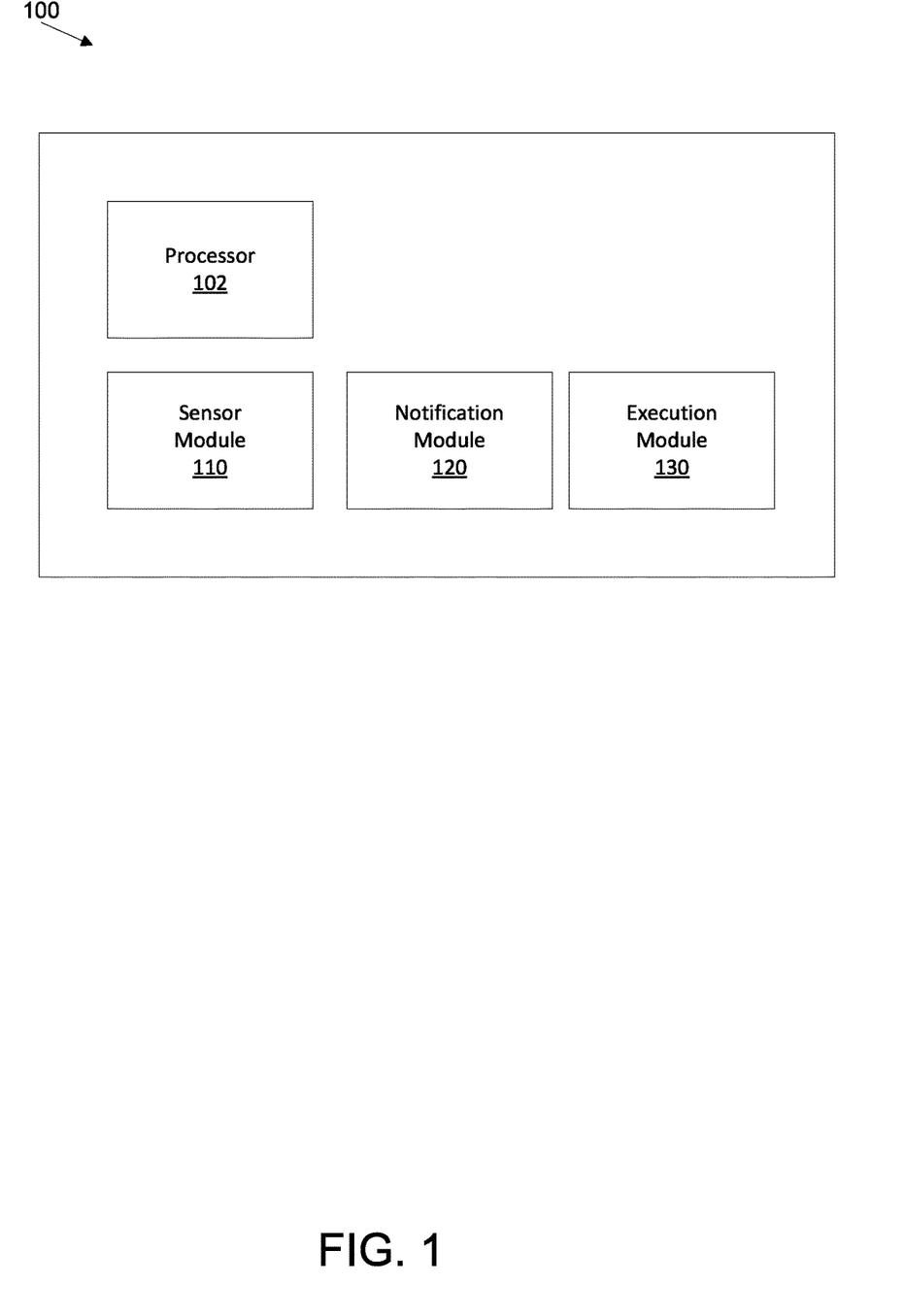
FIG. 1 is a schematic block diagram illustrating one embodiment of an apparatus for a secure attention indicator for a mobile device.

FIG. 1 depicts one embodiment of an apparatus 100 for a secure attention indicator for mobile devices. In one embodiment, the apparatus includes a processor 102, a sensor module 110, a notification module 120, and an execution module 120.

In one embodiment, the secure attention indicator includes input from one or more of a microphone, a touch sensor, an accelerometer, a photoreceptor, and an orientation sensor.

In one embodiment, an apparatus 100 may include a processor 102. A processor 102 may include a central processing unit, a microprocessor, a system-on-a-chip, a physics processing unit, a general purpose processor, a digital signal processor, a front end processor, a coprocessor, or the like. In another embodiment, the processor may include a microcontroller, several processors on a single die, a single integrated circuit, or the like. A processor may include varying levels of internal memory, various instruction sets, various architectures, or other integrated circuit capable of executing operations, or the like, as one skilled in the art may appreciate. Therefore, this disclosure is not limited to any specific type of processor.

In one embodiment, the apparatus may be a mobile computing device that does not include a physical keyboard. A mobile device, in one embodiment, may include devices such as, but not limited to, a laptop, a cellular phone, a personal digital assistant, a tablet, or the like. Because a mobile computing device may not include a keyboard, a touch based display may be a primary means to interface with the apparatus 100. In one embodiment, a software application may be executing and occupy the touch based display interface. In various scenarios, a software application may not perform correctly and may cease accepting commands from the touch based interface. This may prevent a user from stopping the application, switching to other application, resetting the apparatus 100, or performing other actions. Therefore, in one embodiment an apparatus 100 may provide means for a user to indicate a desire to activate a secure attention indicator as described herein. A secure attention indicator may bypass a software application's control of the touch based interface for the apparatus 100.

Therefore, in order to consistently allow a user to bypass an application's control of a screen for a mobile computing device, an apparatus may include a sensor module 110. A sensor module 110 may be configured to detect a secure attention indicator. In one embodiment, a sensor module 110 may detect a secure attention indicator although a screen for a mobile computing device may be unresponsive. A sensor module 110 may be configured to include a microcontroller that monitors input from a variety of input sensors. Further examples, of various input sensors are described in subsequent paragraphs.

In one embodiment, a sensor module 110 may receive an indicator from existing buttons on a mobile computing device. In one example, a mobile computing device may include three different buttons. The buttons may include a power button for switching power on and off, a sleep button for blanking the screen, and a home button for command an operating system to display a home screen. In one example, the sensor module 110 may be configured to detect the three buttons being concurrently pressed and activate a secure attention indicator.

In another example, a sensor module 110 may receive an indicator from existing button by a user pressing a volume up, and a volume down button several times in succession. For example, a user may press volume up and then volume down three times in succession. The sensor module 110 may detect this sequence of button presses and activate a secure attention indicator.

In another embodiment, a sensor module 110 may monitor output of one or more accelerometers. In one embodiment, a sensor module 110 may detect a sequence of taps at the computing device. Taps may be on a screen for the computing device, at a side of the computing device, or other, or the like. For example, three distinct taps at the computing device may indicate to the sensor module 110 that a user desires to indicate a secure attention. The taps for the mobile computing device may be at any location on the computing device because an accelerometer may measure movement, vibrations, or the like, of the computing device in response to a user tapping the computing device.

In another embodiment, a sensor module 110 may detect a shaking of the mobile computing device. Based on input from one or more accelerometers, a sensor module 110 may determine that the mobile computing device is being shaken by a user. In one example, a user may shake the mobile computing device four times up and down. In response to the shaking, the sensor module 110 may determine that the user desires the secure attention indicator to be activated.

In another embodiment, a sensor module 110 may detect a change in an orientation of the mobile computing device based on input from an orientation sensor. In one example, an orientation sensor may include a tilt sensor that senses a tilt of the computing device. In another example, the orientation sensor may include a gyroscope. In another example, an orientation sensor may include a gyrostat, a Foucault Pendulum, a fiber optic gyroscope, a vibrating structure gyroscope, a Coriolis Vibratory Gyroscope, a dynamically tuned gyroscope, a London moment gyroscope, or the like. In a further embodiment, a sensor module 110 may be configured to receive input from two or more orientation sensors. In another embodiment, an orientation sensor may include a compass.

In another embodiment, a sensor module 110 may detect a secure attention indicator based on input from a light sensor. In one embodiment, the sensor module 110 may communicate with a light sensor. In one example, a user may successively cover and uncover the light sensor two or more times. This sequence of actions may also indicate a desire by a user to activate the secure attention indicator.

In another embodiment, a sensor module 110 may detect a secure attention indicator based on input from a microphone. A microphone may be configured to detect a certain sequence of audio signals, certain sounds, certain music, a voice command, or the like. In another example, a microphone may include a wake up recognition circuit and receiving a wake up audio several times may cause the sensor module 110 to determine that a user desires to activate a secure attention indicator. In another example, a microphone may detect a sequence of claps. In response to detecting a sequence of claps, a sensor module 110 may indicate that a user desires activation of the secure indicator.

Therefore, a sensor module 110 may receive input from an audio sensor that indicates a user's desire to activate a secure attention indicator.

In another embodiment, a sensor module 110 may detect a secure attention indicator based on input from a touch screen of the apparatus 100. A touch screen interface may include a touch sensor. A touch sensor may be configured to detect a certain touch, or sequence of touches whereby a user may indicate a desire to activate a secure attention indicator. Although a touch screen may be occupied by a software application executing on the apparatus 100, and although a software application may not be responding to a user's input, as described, a touch sensor may still sense touches. In one embodiment, touches may be sensed by the touch sensor and forwarded to the executing software application. Therefore, a touch sensor may be configured to monitor touch based input and activate a secure attention indicator in response to certain touches, or sequences of touches. In one embodiment, a sensor module 110 may operate behind an operating system of the mobile device. Therefore, although a software application, or the operating system may stop responding to touches, a user may nevertheless activate a secure attention indicator based on touches, or other sensor inputs as described herein.

In one example, a certain touch may be two swipes in succession, the two swipes forming a large X on a touch screen of an apparatus 100. The large X may substantially be the size of the display. In another example, a certain touch may include several successive swipes back and forth on the touch screen of the apparatus 100. In another scenario, a certain touch may include four distinct taps at different locations on the touch screen. Of course, many other certain touches may be defined by a user, and this disclosure is not limited in this regard.

In one embodiment, a sensor module 110 may detect a secure attention indicator based on input from an orientation sensor. An orientation sensor may be configured to detect an orientation of the apparatus 100 whereby a user may indicate a desire to activate a secure attention indicator. In one example, an orientation sensor may detect a spinning of the apparatus 100, or another change in an orientation of the apparatus 100. In response to a detected spinning of the apparatus, a sensor module may activate a secure attention indicator.

In one embodiment, a sensor module 110 may detect a secure attention indicator based on input from a video camera. The sensor module 110 may be configured to monitor video information received from the camera for certain video information. In one example, the sensor module 110 may be configured to detect a user blinking rapidly in view of the camera. In another a sensor module 110 may be configured to detect a user covering up a camera lens in rapid succession, or a certain number of times, like four for example. Of course, this disclosure is not limited in this regard and any detectable actions through a video information stream may cause a sensor module 110 to activate a secure attention indicator.

In another embodiment, a sensor module 110 may detect a secure attention indicator based on a certain gesture from a video stream. In a further embodiment, a sensor module 110 may detect a certain gesture by a user of the apparatus 100 based on a proximity sensor. A proximity sensor may include an infra-red sensor, or other, or the like, as one skilled in the art may appreciate. A sensor module 110 may detect a certain gesture, action, motion, or the like, by a user, and may activate a secure attention indicator in response to detecting the certain gesture, action, motion, or the like.

In another embodiment, a sensor module 110 may detect a secure attention indicator based on a combination of two or more of any or the aforementioned inputs may be an indication from a user that the user desire activation of the secure attention indicator. Therefore, the secure attention indicator may include a combination of two or more physical buttons, microphones, touch sensors, accelerometers, photoreceptors, microprocessor, and/or memory mapped devices.

In a further embodiment, a sequence of shaking and/or tapping, or the like, may be configured by a user. As will be discussed regarding a user interface module (FIG. 2, 220), a sensor module 110 may be configured to detect a wide variety of different inputs, and determine to activate a secure attention indicator in response to the configured sequence of actions.

In another embodiment, the apparatus 100 includes a notification module 120. In one embodiment, the notification module 120 may be configured to notify an execution module 130 in response to the sensor module detecting a secure attention indicator.

A notification module 120 may be configured to receive a secure attention indicator from a sensor module 110. In one embodiment, a processor 102 of the apparatus may include a general purpose input/output (GPIO) pin. A notification module 120 may transmit a signal via the GPIO pin of the processor 102. In this embodiment, the processor 102 may detect a signal via the GPIO pin, and may activate a flag or other indicator.

In another example, a notification module 120 may notify the apparatus 100 by activating a hardware interrupt for the processor 102. As similarly described regarding the GPIO pin, a hardware interrupt may be detected by the processor 102. In another embodiment, as will be further described in FIG. 5, the sensor module 110 may set an indicator in a memory mapped device to indicate an activated secure attention indicator.

In another embodiment, a software low level driver may be configured to detect a GPIO pin. In response to a sensor module 110 transmitting a signal, or setting a voltage at the GPIO, the low level driver may respond to the secure attention indicator. In one example, the low level driver may notify software application being executed by the processor 102. In another embodiment, the notification module 120 may operate at a different operating space as the operating system for the apparatus 100 and may not be part of an operating system for the apparatus 100.

In another example, the sensor module 110 may write a flag to memory in the processor 102, or other microcontroller, or the like. A low level driver may be configured to monitor the memory location and may detect the flag in the memory in the processor 102. In another embodiment, the low level driver may notify an operating system that the secure attention indicator had been activated. In response, the operating system for the apparatus 100 may execute secure trusted code, or another software application, or the like. Further embodiments regarding the low level driver are described regarding the execution module 130.

In one embodiment, the apparatus 100 includes an execution module 130. In another embodiment, the execution module 130 is configured to execute secure trusted executable code in response to receiving the notification. In one embodiment, the secure trusted executable code may include a software application for interfacing with a user of the apparatus 100.

In another embodiment, the secure trusted executable code is not modifiable by a user. The secure trusted code may be stored in a read only memory of the apparatus 100, so that a user may not modify the secure trusted code. In one embodiment, the secure trusted code may be updated by an operating system update application. Therefore, in certain embodiment, the secure trusted code may be altered by a user as part of an operating system update, however, the apparatus 100 may be configured to not allow changes to the secure trusted code in other circumstances.

In one embodiment, the secure trusted executable code may be secure because it is not modifiable by a user under normal operating circumstances. Therefore, malicious software, or other executable code, operating at a user level, may not be allowed to alter the secure trusted executable code. In one example, malicious software executing at a user level may attempt to alter the secure trusted executable code, however, it may not be successful. The secure trusted executable code may be stored in a secure area of a memory of the apparatus 100.

In another embodiment, the secure trusted executable code may verified based on a hash, checksum, or other checking mechanism to ensure that the executable code is authentic. In one example, an MD5 hash on the executable code may ensure that the secure trusted executable code has not been altered from an original state. Therefore, the secure trusted executable code may be more trusted than other executable code on in a memory of the apparatus 100.

In one embodiment, the execution module may include an operating system of the apparatus 100. In response to receiving the notification, the operating system may perform other actions, based at least in part, on the secure attention indicator. In one example, the operating system may terminate a software process. In another example, the operating system may execute the secure trusted code. In another example, the operating system may bypass a locked screen of the apparatus 100. In another example, the operating system may return to a home screen, or may instantiate another software application to interface with the user.

In one embodiment, malware, or other software application executing on a mobile device may not be trusted. Therefore, non-trusted software applications may not be allowed to access the secure trusted executable code. Therefore, in response to a mobile device that has been compromised by malware, a virus, or other malicious software, a user may execute the secure trusted code by activating the secure attention indicator. This may allow a user to terminate malicious code, or otherwise regain control of the mobile device.

In one example, a user may be playing a game, wherein the game was provided by an unknown software programmer, and therefore, is not a trusted application. A user may subsequently desire to perform one or more financial transactions, and may switch from the game, to a financial application. Because, of the untrusted nature of the game, a user may not necessarily be sure that the switch was to an actual financial application, or to another portion of the game designed to trick the user.

Therefore, in one example, as described, a user may be playing the untrusted game, and subsequently desire to perform one or more financial transactions. Therefore, a user may activate the secure attention indicator as previously described, and execute the secure trusted code. A user may use the secure trusted code, to execute the financial application. In this way, a user may be certain that the financial application is the actual and original financial application on the apparatus 100, and not a fake, or malicious code executing on the apparatus 100.

In one embodiment, the secure trusted code may cause an operating system of the apparatus 100 to return to a home screen. In response to returning to the home screen, a user of the apparatus 100, may select another software application to execute. Therefore, because of the secure trusted nature of the secure trusted executable code, a user may ensure that malicious software cannot take control of the apparatus 100. In one embodiment, the secure trusted executable code may operate as part of the operating system. As one skilled in the art may appreciate, a portion of the operating system may be kept secure from a user. Therefore, secure trusted executable code may also be stored as part of an operating system of the apparatus 100.

Figure 2:
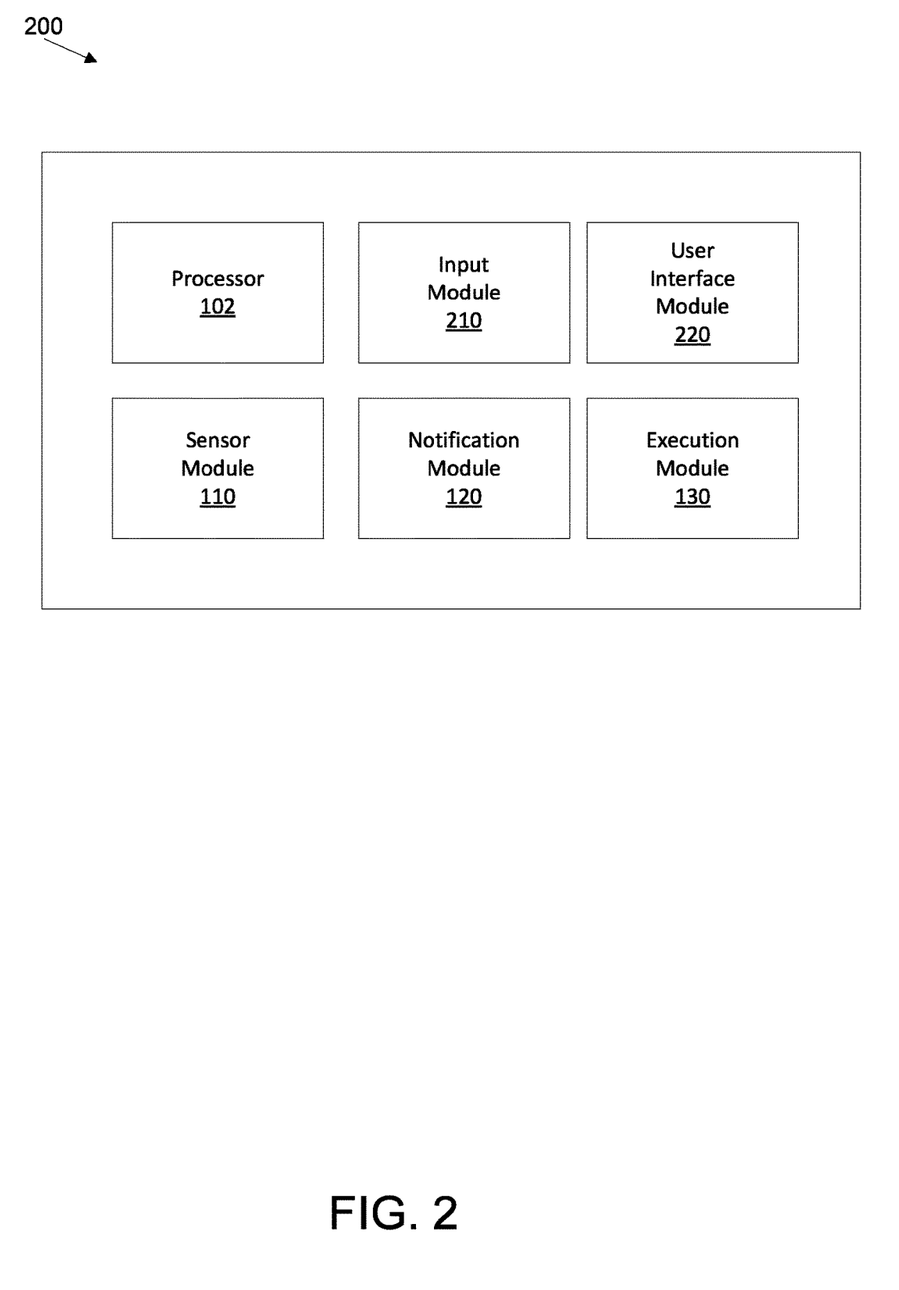
FIG. 2 is a schematic block diagram illustrating one embodiment of an apparatus for a secure attention indicator for a mobile device.

FIG. 2 is a schematic block diagram illustrating one embodiment of an apparatus 200 for a secure attention indicator for a mobile device. In one embodiment, the apparatus 200 may include a processor 102, a sensor module 110, a notification module 120, an execution module 130, an input module 210, and a user interface module 220. The processor 102, the sensor module 110, the notification module 120 and the execution module 130 may or may not be substantially similar to similar module depicted in FIG. 1.

In one embodiment, the apparatus 200 includes an input module 210. An input module may be configured to receive the secure attention indicator from a sensor at the apparatus. In another embodiment, the input module 210 may include one or more of a physical button, a microphone, a touch sensor, an accelerometer, a photoreceptor, a microprocessor, and a memory mapped device.

In one example, the input module 210 may perform substantially similar functions as the sensor module 110, however, this is not necessarily the case. In example, the input module 210 may include a volume button. In another example, the input module 210 may include a microphone. In another example, the input module 210, may include a touch sensor at a touch screen of the apparatus 200. In another example, the input module 210 may include an accelerometer configured to detect one or more shakes or taps at the apparatus 200. In another example, the input module 210 may include a photoreceptor configured to detect one or more brightness levels at the apparatus 200.

In another embodiment, the apparatus 200 may include a user interface module 220. In one embodiment, the user interface module may be configured to output information to a user of the apparatus, the information based on the secure trusted executable code. In one example, an operating system of the apparatus 200 may execute the secure trusted executable code, and the user interface module 220 may display one or more dialogs, buttons, controls, or the like.

In a further embodiment, the user interface module 220 may be configured to provide an interface to the user for altering the secure attention indicator. For example, a user interface module 220 may display a selection to the user allowing a user to select one or the inputs previously described, and configured the secure attention indicator. For example, a user may select one or more input devices to be included in the secure attention indicator. In another example, a user may indicate a sequence of inputs to be included in the secure attention indicator.

In one example, a user may configured a sequence of buttons, such as, but not limited to, volume up, volume down, volume up, volume down, power. Of course, other sequences of button presses may be used and this disclosure is not limited in this regard.

In another example, a user may record a segment of audio. The user may then, through the user interface module 220, configured the recorded segment of audio as the secure attention indicator. Therefore, at a later time, in response to this configuration, an input module 210 may activate a secure attention indicator after receiving the segment of audio via a microphone of the apparatus 200.

In another embodiment, a user may indicate a desire to record a series of motions of the apparatus 200. For example, a user may indicate to record motion, and a user may subsequently shake or tap the apparatus in some order. After recording a set of motions, a user may indicate through the user interface module 220 that the secure attention indicator may include the series of motions. Of course, exact duplication of motions are not required, and the input module 210 may accommodate some variation of tolerations of imperfection by a user.

A secure attention indicator, in certain embodiment, may also include any combination of the aforementioned indicators. Therefore, a user may configured several different means for activating the secure attention indicator. The sensor module 110 may concurrently detect one or more different secure attention indicators at the apparatus 200.

Figure 3:
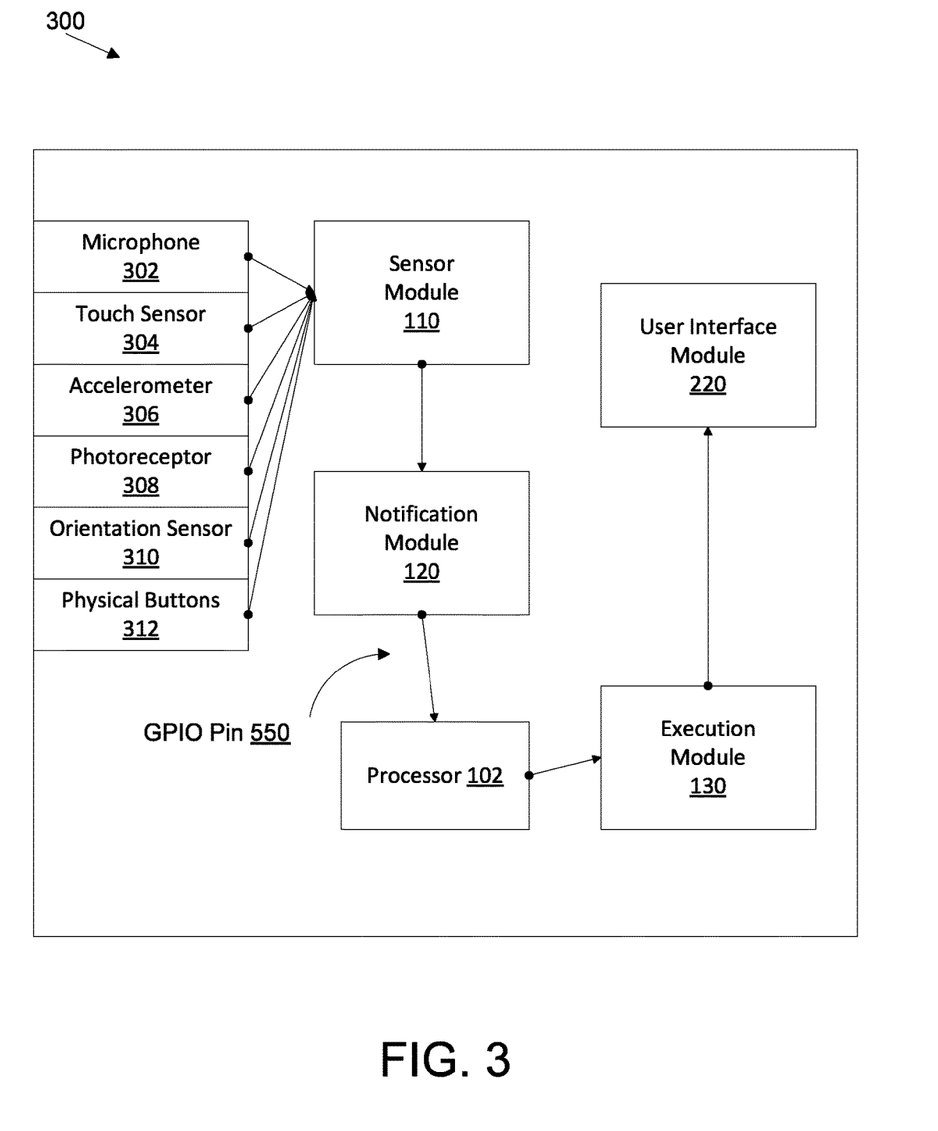
FIG. 3 is a schematic block diagram illustrating one embodiment of an apparatus for a secure attention indicator for a mobile device.

FIG. 3 is a schematic block diagram illustrating one embodiment 300 of an apparatus for a secure attention indicator for a mobile device. In one embodiment, the apparatus 300 may include a microphone, 203, a touch sensor 304, an accelerometer 306, a photoreceptor 308, an orientation sensor 310, physical buttons 312, a sensor module 110, a notification module 120, a processor 530, an execution module 130, and a user interface module 220. The various input sensors 302-312 may or may not be substantially similar to similar input devices previously described. Furthermore, the sensor module 110, the notification module 120, the execution module 130, and the user interface module 220 also may or may not be substantially similar to similar modules depicted in earlier figures.

In one example, an accelerometer 306 may detect a sequence of shakes and taps that are consistent with a pre-determined pattern of shakes and taps configured by the user. In response to the detect shakes and/or taps, a sensor module 110 may activate a secure attention indicator. The sensor module 110 may transmit the secure attention indicator to the notification module 120. The notification module 120 may notify a processor 530 of the activation using a GPIO pin 550. The processor 530 may notify an execution module 130 that the secure attention indicator had been activated. The execution module 130 may execute secure trusted executable code and may communicate with a user interface module 220 to display one or more interfaces to a user. Therefore, in response to a series of actions by a user at the apparatus 300, a user may cause secure trusted executable code to be executed by a processor 530.

Figure 4:
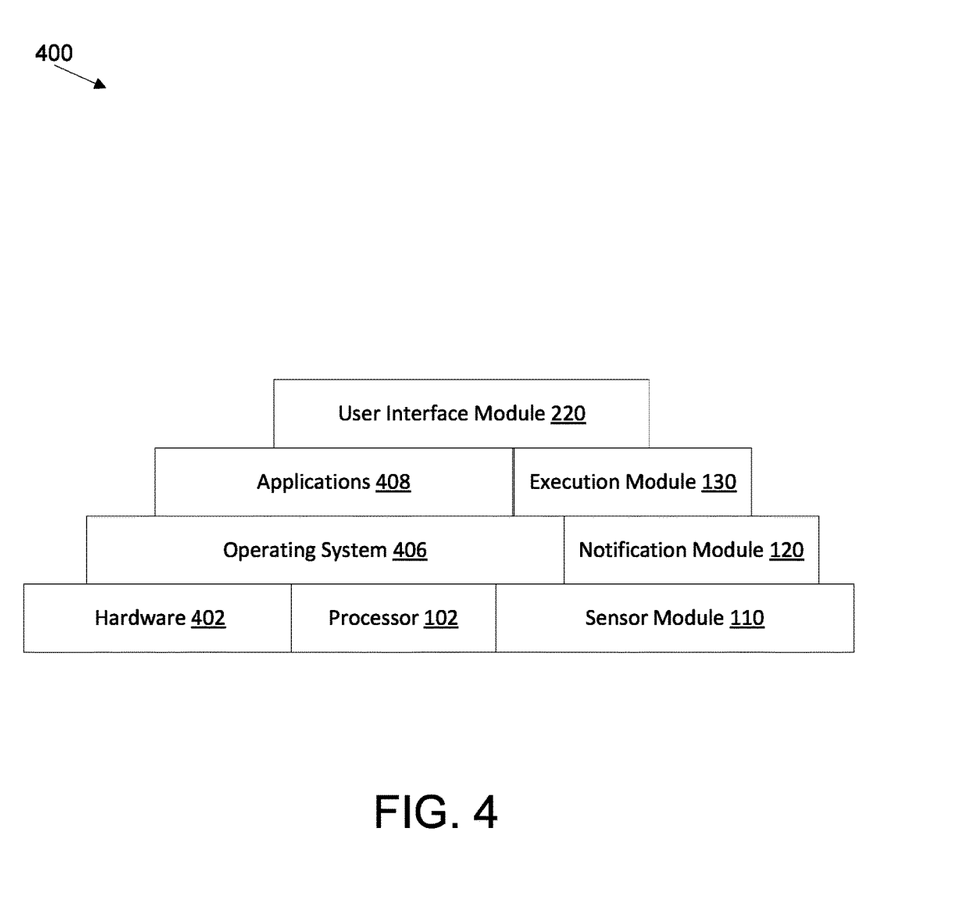
FIG. 4 is a diagram depicting a logical structure of components for an apparatus as disclosed herein.

FIG. 4 is a diagram depicting a logical structure of components for an apparatus as disclosed herein. In one embodiment, an apparatus may include various hardware interfaces 402, a processor interface 404, and a sensor module 110. The physical components of such an apparatus may be communicated with and/or controlled using the various interfaces 402, 404, 110. In this embodiment, the sensor module 110 may include various hardware sensor, however, as previously described, this disclosure is not limited in this regard.

At a higher logical level, an operating system 406 may communicate with the various hardware interfaces 402, 404, 110. A notification module 120 may execute with the operating system 406, however may be logically separated from the operating system 406. An operating system 406 may execute application 408 as directed by a user, or other software executable code. An execution module 130 may also execute an application or other executable software code as secure attention indicators are received by the notification module 120. Applications 408 may be executed in a different logical execution space than the secure trusted executable code executed by the execution module 130, however this is not necessarily the case. The user interface module 220 may depict several different user interfaces as directed to by various software applications 408 as well as by the execution module 130. Therefore, although a software application 408 may freeze, hang, or otherwise perform inadequately, an execution module 130 may nevertheless cause a display to be shown to a user through the user interface module 220.

Furthermore, although an operating system may stop performing correctly, a sensor module 110 may sense a secure attention indicator, a notification module 120 may indicate that the secure attention indicator was received, an execution module 130 may execute secure trusted executable code in response to the secure attention indicator, and a user interface module 220 may display a user interface based on the secure attention indicator.

In another embodiment, an execution module 130 may operate as a high priority thread as part of the operating system. In a further embodiment, the notification module may include a low level driver for an operating system, whereby the low level driver may cause the secure trusted executable code to be executed.

Figure 5:
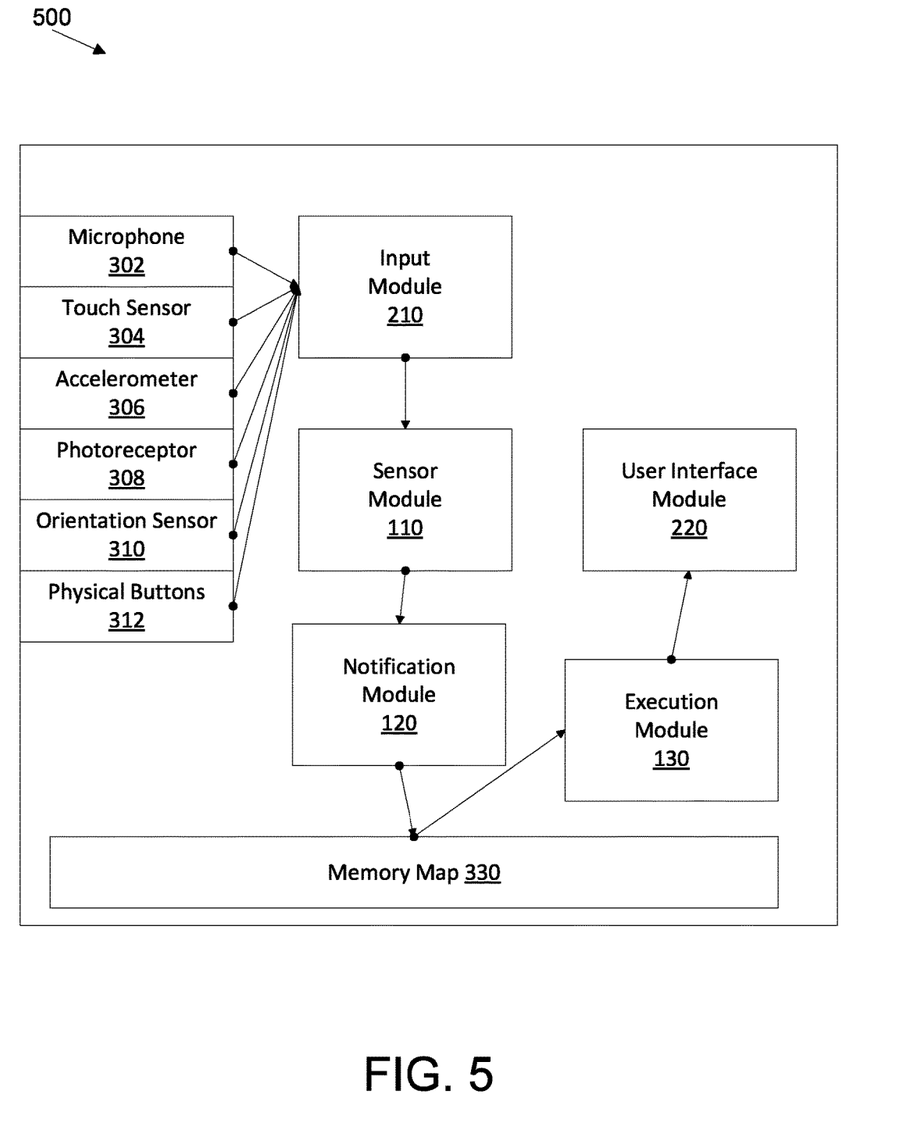
FIG. 5 is a schematic block diagram illustrating one embodiment of an apparatus for a secure attention indicator for a mobile device.

FIG. 5 is a schematic block diagram illustrating one embodiment of an apparatus for a secure attention indicator for a mobile device. The apparatus 500 may include a microphone 302, a touch sensor 304, an accelerometer 306, a photoreceptor 308, an orientation sensor 310, physical buttons 312, a sensor module 110, a notification module 120, a memory map 330, an execution module 130, and a user interface module 220. Various devices or module also depicted in FIG. 4 may or may not be substantially similar to those devices or module depicted.

In one embodiment, the apparatus 500 may include a memory map 330, or a memory mapped device. The memory map 330 may include physical memory for storing one or more indicators for the apparatus 500. In one embodiment, the notification module 120 may store an indicator in the memory map 330 indicating that the secure attention indicator had been detected by the sensor module 110. As depicted in FIG. 5, the input module 210 may communicate with the different input sensors 302-312, and notify the sensor module 110 when a secure attention indicator had been detected.

In one embodiment, the notification module 120 may write a flag to a portion of memory in the memory map. The flag may indicate that the secure attention indicator had been activated. An execution module 130 may monitor memory in the memory map 330 and may detect the flag written by the notification module 120 by reading the indicator in the memory. In response to detecting the secure attention indicator, the execution module 130 may execute secure trusted executable code. In response to the secure trusted executable code, the user interface module 220 may display one or more user interfaces to communicate with a user.

Figure 6:
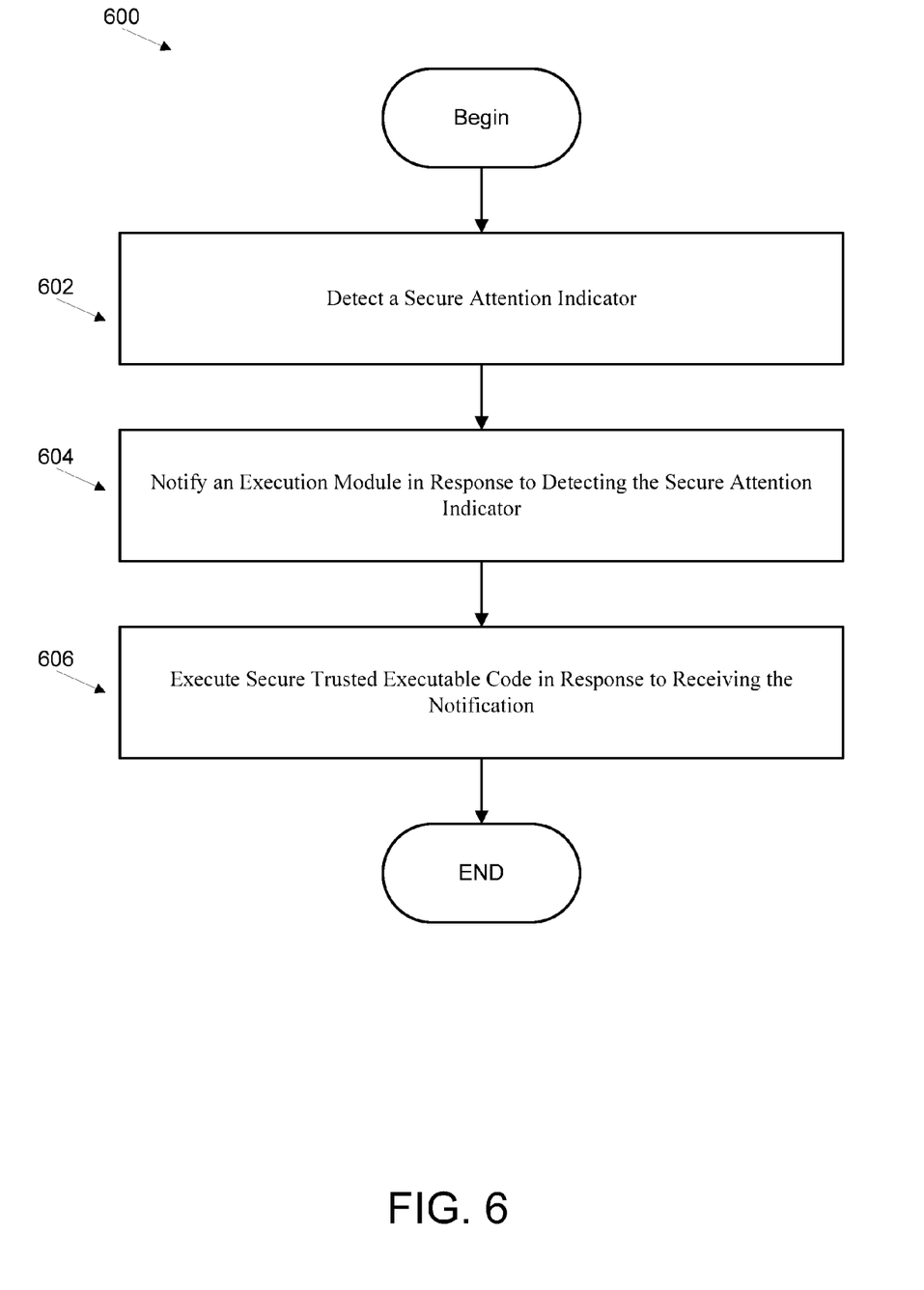
FIG. 6 is a schematic flow chart diagram illustrating one embodiment of a method for a secure attention indicator.

FIG. 6 is a schematic flow chart diagram illustrating one embodiment 600 of a method for a secure attention indicator. In one embodiment, the method may being and a sensor module 110 may detect 602 a secure attention indicator. A notification module 120 may notify 604 an execution module 130 in response to detecting the secure attention indicator. An execution module 130 may execute 606 secure trusted executable code in response to receiving the notification, and the method may end.

Figure 7:
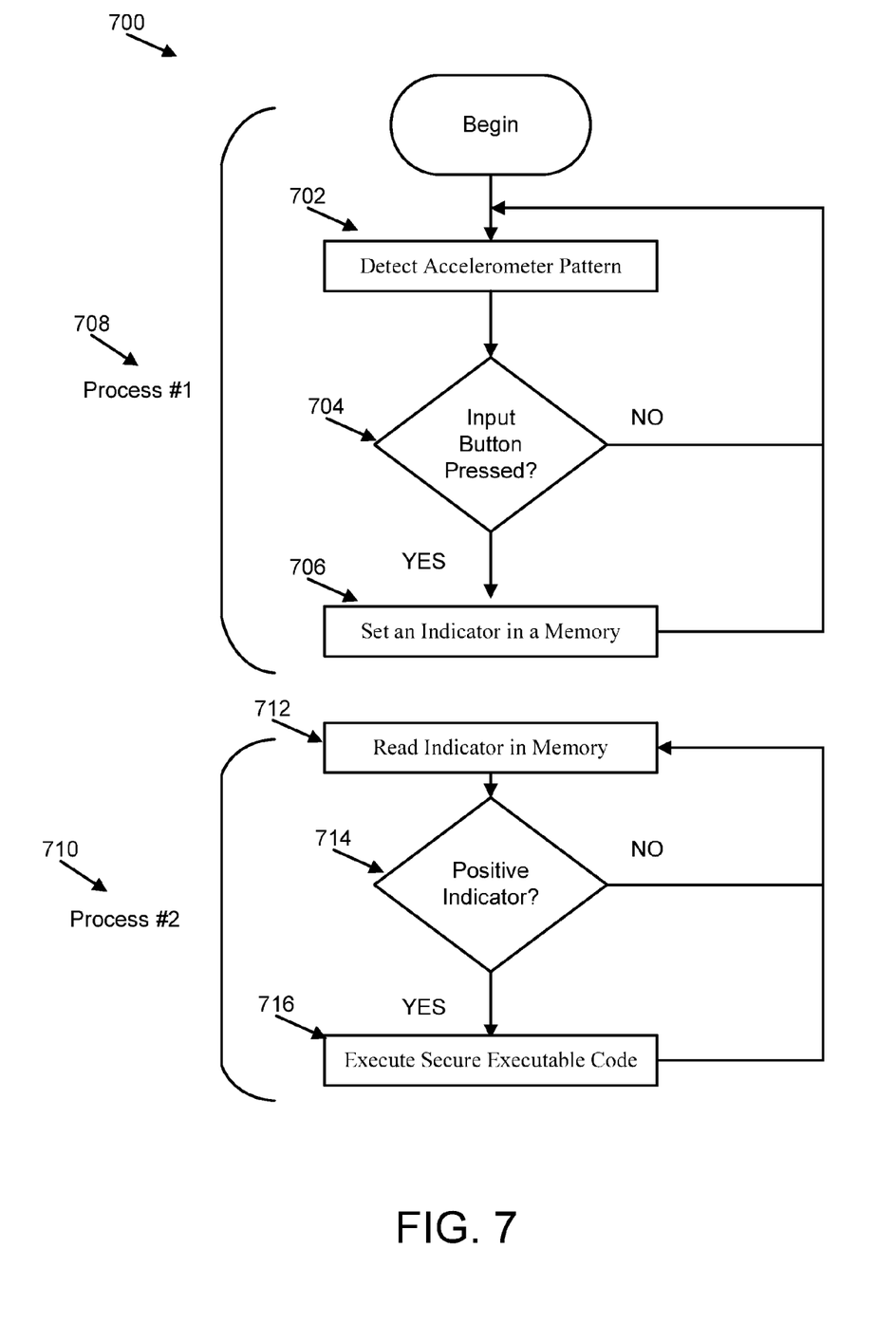
FIG. 7 is a schematic flow chart diagram illustrating one embodiment of a secure attention indicator method.

FIG. 7 is a schematic flow chart diagram illustrating one embodiment of a method 700 for secure attention indication. In one embodiment, the method 700 may include two different processes 708,710. A first process 708 may begin and a sensor module 110 may detect 702 an accelerometer pattern, or input consistent with a predefined pattern of acceleration. The sensor module 110 may determine 704 if an input button is concurrently pressed with the pattern of accelerometer input. If the button pressing is concurrent with the acceleration pattern, a notification module 120 may set 706 an indicator in a memory. If the button pressing is not concurrent with the acceleration pattern, no action may be taken by the notification module 120, or an indicator may be cleared in the memory.

A second process 710 is also depicted in FIG. 7. The second process 710 may operate concurrently with the first process 708. According to the second process, an execution module 130 may read 712 the memory described in the first process 708. If the indicator is not positive 714, the execution module 130 may read the indicator again. In another example, the execution module 130 may wait a period of time before reading the indicator again. If the indicator is positive 714, the execution module 130 may execute 716 secure trusted executable code, as previously described.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a secure memory that stores trusted executable code not modifiable by a user;
a display operatively coupled to the processor;
a sensor module that:
detects a first input sequence from one or more of a microphone, a touch sensor, an accelerometer, a photoreceptor, and an orientation sensor, wherein the first input sequence comprises a first plurality of inputs received sequentially;
stores the first input sequence in a memory; and
detects a secure attention indicator, the secure attention indicator comprising a second input sequence from one or more of a microphone, a touch sensor, an accelerometer, a photoreceptor, and an orientation sensor, wherein detecting the secure attention indicator comprises determining whether the second input sequence matches the first input sequence, and wherein the second input sequence comprises a second plurality of inputs received sequentially;
an execution module that executes the trusted executable code; and
a notification module that informs the execution module in response to the sensor module determining that the second input sequence matches the first input sequence, wherein the notification module informs the execution module by activating a hardware interrupt for the processor;
wherein the execution module executes the trusted executable code in response to receiving the hardware interrupt and said modules comprise one or more of a hardware circuit, a programmable logic device and executable code, the executable code stored on one or more non-transitory computer readable storage media, and wherein the trusted executable code performs an action selected from the group consisting of terminating a software process, terminating malicious code, instantiating a software application separate from an operating system, executing a portion of the operating system, bypassing a locked screen, returning to a home screen, and taking control of the apparatus from malicious code.

2. The apparatus of claim 1, further comprising an input module that receives the secure attention indicator, the input module comprising one or more of a physical button, a microphone, a touch sensor, an accelerometer, a photoreceptor, a microprocessor, and a memory mapped device.

3. The apparatus of claim 1, further comprising a user interface module that outputs information to a user of the apparatus, the information based on the secure trusted executable code.

4. The apparatus of claim 2, wherein the input module comprises a microprocessor selected from the group consisting of a microprocessor comprising a general purpose input/output pin, and a microprocessor comprising an interrupt handler.

5. The apparatus of claim 2, wherein the secure attention indicator comprises a combination of two or more of physical buttons, microphones, touch sensors, accelerometers, photoreceptors, microprocessors, and memory mapped devices.

6. The apparatus of claim 1, wherein the notification module operates as a low level driver for the operating system, the low level driver receives the secure attention indicator from the sensor module, the secure trusted executable code comprising an application.

7. The apparatus of claim 1, wherein the notification module comprises a memory mapped device, the notification module sets an indicator in the memory mapped device, the execution module receives the notification by reading the indicator in the memory mapped device.

8. The apparatus of claim 1 wherein the sensor module, the notification module, and the execution module comprise one or more of semiconductor hardware, a memory that stores computer readable code, and a processor that executes the computer readable code.

9. A method comprising:
storing trusted executable code in a secure memory, the trusted executable code not modifiable by a user;
detecting a first input sequence from one or more of a microphone, a touch sensor, an accelerometer, a photoreceptor, and an orientation sensor, wherein the first input sequence comprises a first plurality of inputs received sequentially;
storing the first input sequence;
detecting a secure attention indicator at a mobile computing device, the secure attention indicator comprising a second input sequence from one or more of a microphone, a touch sensor, an accelerometer, a photoreceptor, and an orientation sensor, wherein detecting the secure attention indicator comprises determining whether the second input sequence matches the first input sequence, and wherein the second input sequence comprises a second plurality of inputs received sequentially;
notifying the mobile computing device in response to determining that the second input sequence matches the first input sequence, wherein the mobile computing device is notified by activating a hardware interrupt for a processor of the mobile computing device; and executing the trusted executable code in response to receiving the hardware interrupt, wherein the trusted executable code performs an action selected from the group consisting of terminating a software process, terminating malicious code, instantiating a software application separate from an operating system, executing a portion of the operating system, bypassing a locked screen, returning to a home screen, and taking control of the mobile computing device from malicious code.

10. The method of claim 9, further comprising receiving the secure attention indicator via one or more input devices of the mobile computing device, the one or more input devices comprising one of a physical button, a microphone, a touch sensor, an accelerometer, a photoreceptor, a microprocessor, and a memory mapped device.

11. The method of claim 9, wherein the microprocessor comprises one of a general purpose input/output pin and an interrupt handler.

12. The method of claim 9, wherein the secure attention indicator comprises a combination of two or more of the physical buttons, microphones, touch sensors, accelerometers, photoreceptors, microprocessors, and memory mapped devices.

13. The method of claim 9, wherein notifying the mobile computing device comprises notifying a low level driver for the operating system, the operating system operating the mobile computing device, the low level driver causing the secure trusted executable code to be executed.

14. The method of claim 9, wherein notifying the mobile computing device comprises setting an indicator in a memory mapped device and executing the secure trusted executable code comprises executing the secure trusted executable code in response to reading the indicator in the memory mapped device.

15. A program product comprising a non-transitory computer readable storage medium that stores code executable by a processor to perform:

storing trusted executable code in a secure memory, the trusted executable code not modifiable by a user;

detecting a first input sequence from one or more of a microphone, a touch sensor, an accelerometer, a photoreceptor, and an orientation sensor, wherein the first input sequence comprises a first plurality of inputs received sequentially;

storing the first input sequence;

detecting a secure attention indicator at a mobile computing device, the secure attention indicator comprising a second input sequence from one or more of a microphone, a touch sensor, an accelerometer, a photoreceptor, and an orientation sensor, wherein detecting the secure attention indicator comprises determining whether the second input sequence matches the first input sequence, and wherein the second input sequence comprises a second plurality of inputs received sequentially;

notifying the mobile computing device in response to determining that the second input sequence matches the first input sequence, wherein the mobile computing device is notified by activating a hardware interrupt for a processor of the mobile computing device; and executing the trusted executable code in response to receiving the hardware interrupt, wherein the trusted executable code performs an action selected from the group consisting of terminating a software process, terminating malicious code, instantiating a software application separate from an operating system, executing a portion of the operating system, bypassing a locked screen, returning to a home screen, and taking control of the mobile computing device from malicious code.

16. The program product of claim 15, the code further receiving the secure attention indicator via one or more input devices of the mobile computing device, the one or more input devices comprising one or more of a physical button, a microphone, a touch sensor, an accelerometer, a photoreceptor, a microprocessor, and a memory mapped device.

17. The program product of claim 15, wherein notifying the module computing device comprises setting a general purpose input/output pin of a microprocessor.

18. The program product of claim 15, wherein the secure attention indicator comprises input from a combination of two or more of the group comprising physical buttons, microphones, touch sensors, accelerometers, photoreceptors, microprocessors, and memory mapped devices.

19. The program product of claim 15, wherein notifying the mobile computing device comprises notifying a low level driver for the operating system, the operating system operating the mobile computing device, the low level driver causing the secure trusted executable code to be executed.

20. The program product of claim 15, wherein notifying the mobile computing device comprises setting an indicator in a memory mapped device and executing the secure trusted executable code comprises executing the secure trusted executable code in response to reading the indicator in the memory mapped device.

* * * * *